(No Model.)

F. C. SOPER.
ORNAMENTAL PRISM LIGHT.

No. 595,270.  Patented Dec. 7, 1897.

Witnesses:
Frank S. Blanchard
Donald M. Carter

Inventor:
Frank C. Soper.

THE NORRIS PETERS CO., PHOTO-LITHO., WASHINGTON, D. C.

UNITED STATES PATENT OFFICE.

FRANK C. SOPER, OF CHICAGO, ILLINOIS, ASSIGNOR TO THE LUXFER PRISM PATENTS COMPANY, OF SAME PLACE.

ORNAMENTAL PRISM-LIGHT.

SPECIFICATION forming part of Letters Patent No. 595,270, dated December 7, 1897.

Application filed September 7, 1897. Serial No. 650,700. (No model.)

*To all whom it may concern:*

Be it known that I, FRANK C. SOPER, a citizen of the United States, residing at Chicago, in the county of Cook and State of Illinois, have invented certain new and useful Improvements in Ornamental Prism-Lights, of which the following is a specification.

My invention relates to prism-lights, and has for its object to provide a new and improved prism-light, of which the following is a description, reference being had to the accompanying drawings, wherein—

Figure 1:
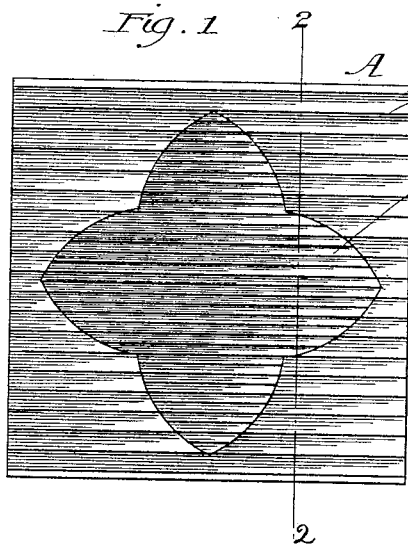
Figure 2:
Figure 3:
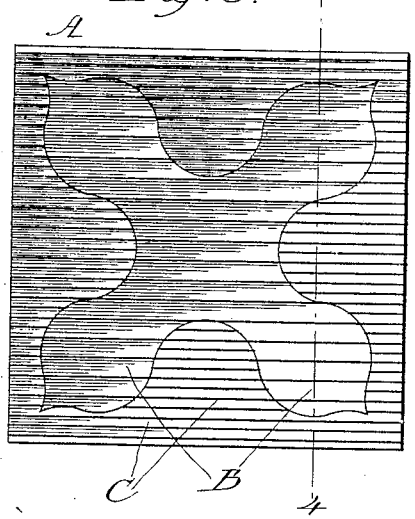
Figure 4:
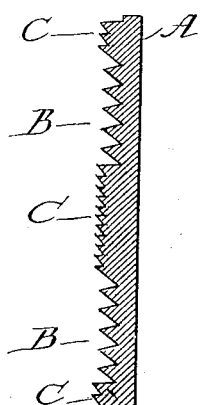
Figure 5:
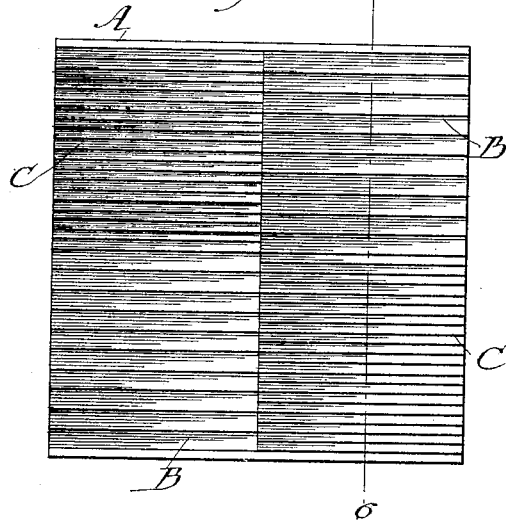
Figure 6:
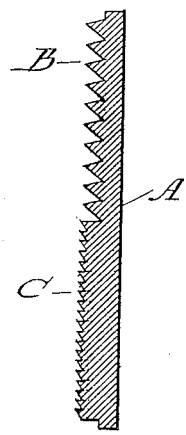

Figure 1 is a view of a prism-light embodying my invention. Fig. 2 is a section on line 2 2, Fig. 1. Fig. 3 is a view showing a modified form of design. Fig. 4 is a section on line 4 4, Fig. 3. Fig. 5 shows a further modified design. Fig. 6 is a section on line 6 6, Fig. 5.

Like letters refer to like parts throughout the several figures.

As illustrated in Fig. 1, I have shown a prism-light A, formed of a single piece of material and provided with the prisms B and C. The prisms C are smaller and are separated by smaller spaces than the prisms B and are systematically arranged so as to produce a design on the prism-light as shown.

In Figs. 3 to 6 I have shown simple designs differing from the design shown in Fig. 1. In all these figures it will be noted that the design is formed on a prism-light wherein the prisms are all integral with the light, so that there is only a single piece, the design being due to prisms of various sizes.

I have only attempted to show simple designs to which my invention is applied, so that its application may be readily understood, and it is of course evident that designs of any suitable description may be formed in this manner upon the prism-lights, the prisms being utilized to distribute the light or direct it in any desired direction. The prism-lights may be molded or rolled or formed in any desired manner, and I do not limit myself in any manner to the description herewith presented.

The prism-lights formed in accordance with my invention may be combined into a prism-plate in the ordinary manner and only a portion of the design may be formed on any given prism-light, if desired, the entire design being produced only when the prism-lights are bound together. The prisms in this case are systematically arranged so as to produce an increased illuminating effect when they are placed in the aperture through which the light is admitted, and the prisms may be of different sizes.

I have spoken of designs, though, of course, I do not mean this to be an application for a patent on a design. It is only that in order to avail oneself of my improvement it is necessary to form some kind of a design that I have spoken of this matter and called attention to the fact that ornamental designs may thus be produced. The essential feature of the invention as shown in the drawings is the fact that the prisms are shaped so that while all run in the same direction across the plate and all coöperate and are systematically arranged to produce an increased illuminating effect, still the ends of the prisms of the various groups do not "register," so to speak, and therefore the long, continuous, and uniform prisms which characterize other prism-lights are not to be found in this construction. This result is best accomplished by the prisms of different sizes, as indicated; but the line of demarcation between the two groups of prisms is produced not by their different sizes, but by the fact that their edges or ends do not register and do not, therefore, produce a complete or continuous prism clear across the plate. Many defects in the prisms themselves and many difficulties in their manufacture have resulted from these long prisms, and it has been difficult to overcome such troubles, and this is one of the means whereby it can be done and whereby the irregularities and imperfections in the prism side may be minimized or rendered less evident or obvious to the observer.

I claim—

1. A prism-light comprising a substantially flat and comparatively thin body of transparent material provided with series of prisms running parallel to each other and all arranged systematically to produce an increased illuminating effect, the series of prisms arranged in groups so that the ends of the prisms of one group abut against but do not register with the ends of the prisms of another group.

2. A prism-light comprising a substantially flat and comparatively thin body of transparent material provided with series of prisms running parallel to each other and all arranged systematically to produce an increased illuminating effect, the series of prisms arranged in groups so that the ends of the prisms of one group abut against but do not register with the ends of the prisms of another group, and the prisms of one series being smaller or the grooves between them shallower than the prisms and grooves of another group.

FRANK C. SOPER.

Witnesses:
DONALD M. CARTER,
BERTHA C. SIMS.